United States Patent
Pinette et al.

(10) Patent No.: US 7,748,409 B2
(45) Date of Patent: Jul. 6, 2010

(54) OVERMOLD INTERFACE FOR FLUID CARRYING SYSTEM

(75) Inventors: Thomas C. Pinette, Indianapolis, IN (US); Kurt J. Thomas, Indianapolis, IN (US); Derek A. Brown, Lizton, IN (US)

(73) Assignees: Masco Corporation of Indiana, Indianapolis, IN (US); Mercury Plastics, Inc., Middlefield, OH (US)

( * ) Notice: Subject to any disclaimer, the term of this patent is extended or adjusted under 35 U.S.C. 154(b) by 720 days.

(21) Appl. No.: 11/700,801

(22) Filed: Jan. 31, 2007

(65) Prior Publication Data
US 2008/0178942 A1    Jul. 31, 2008

(51) Int. Cl.
*F16K 21/00* (2006.01)
(52) U.S. Cl. ....................................................... 137/801
(58) Field of Classification Search ................. 137/801; 4/675–678
See application file for complete search history.

(56) References Cited

U.S. PATENT DOCUMENTS

| | | | |
|---|---|---|---|
| 2,200,091 A | 5/1940 | Kovach | |
| 2,219,471 A | 10/1940 | Davis | |
| 2,546,327 A | 3/1951 | Young | |
| 2,548,933 A | 4/1951 | Barnett | |
| 2,781,786 A | 2/1957 | Young | |
| 2,884,007 A | 4/1959 | Green | |
| 3,229,710 A | 1/1966 | Keller, III | |
| 3,422,849 A | 1/1969 | Manoogian | |
| 3,505,098 A | 4/1970 | Miller et al. | |
| 3,520,325 A | 7/1970 | Stuart | |
| 3,580,289 A | 5/1971 | James et al. | |
| 3,590,876 A | 7/1971 | Young | |
| 3,600,723 A | 8/1971 | Mongerson et al. | |
| 3,757,824 A | 9/1973 | Parkhurst et al. | |
| 3,796,380 A | 3/1974 | Johnson et al. | |
| 3,807,453 A | 4/1974 | Dom et al. | |
| 3,854,493 A | 12/1974 | Farrell | |
| 3,965,936 A | 6/1976 | Lyon | |
| 3,989,787 A | 11/1976 | Scott, Jr. et al. | |
| 3,998,240 A | 12/1976 | Liautaud | |
| 4,000,857 A | 1/1977 | Moen | |
| 4,026,328 A | 5/1977 | Nelson | |
| 4,076,279 A | 2/1978 | Klotz et al. | |
| 4,103,709 A | 8/1978 | Fischer | |
| 4,130,136 A | 12/1978 | Garnier et al. | |

(Continued)

FOREIGN PATENT DOCUMENTS

CA    2 541 226    11/2006

(Continued)

OTHER PUBLICATIONS

Noveon, Inc.; Processing with TempRite® PEX Ensures Quality Piping, www.tempritepex.com/processingInstallation/processing.asp, at least as early as Jun. 7, 2005, 2 pgs.

(Continued)

*Primary Examiner*—John Rivell
*Assistant Examiner*—Craig M Schneider
(74) *Attorney, Agent, or Firm*—Baker & Daniels LLP

(57) ABSTRACT

A fluid carrying system is disclosed including a fluid transport component and an overmold component.

25 Claims, 3 Drawing Sheets

U.S. PATENT DOCUMENTS

| | | |
|---|---|---|
| 4,221,338 A | 9/1980 | Shames et al. |
| 4,316,870 A | 2/1982 | Rowley |
| 4,337,795 A | 7/1982 | Argyris et al. |
| 4,356,574 A | 11/1982 | Johnson |
| 4,357,957 A | 11/1982 | Bisonaya et al. |
| 4,387,738 A | 6/1983 | Bisonaya et al. |
| 4,415,389 A | 11/1983 | Medford et al. |
| 4,446,084 A | 5/1984 | Rowley |
| 4,453,567 A | 6/1984 | MacDonald |
| 4,458,839 A | 7/1984 | MacDonald |
| 4,484,600 A | 11/1984 | Peterson et al. |
| 4,502,507 A | 3/1985 | Hayman |
| 4,513,769 A | 4/1985 | Purcell |
| 4,525,136 A | 6/1985 | Rowley |
| 4,552,171 A | 11/1985 | Farrell et al. |
| 4,577,835 A | 3/1986 | Holycross et al. |
| 4,580,601 A | 4/1986 | Schlotman et al. |
| 4,592,388 A | 6/1986 | Wilcox |
| 4,607,659 A | 8/1986 | Cole |
| 4,610,429 A | 9/1986 | Arnold et al. |
| 4,626,005 A | 12/1986 | Stifter |
| 4,635,673 A | 1/1987 | Gerdes |
| 4,649,958 A | 3/1987 | Purcell |
| 4,652,263 A | 3/1987 | Herweck et al. |
| 4,664,423 A | 5/1987 | Rowley |
| 4,667,987 A | 5/1987 | Knebel |
| 4,687,025 A | 8/1987 | Kahle et al. |
| 4,700,928 A | 10/1987 | Marty |
| 4,708,172 A | 11/1987 | Riis |
| 4,754,993 A | 7/1988 | Kraynick |
| 4,760,871 A | 8/1988 | Vijay |
| 4,762,143 A | 8/1988 | Botnick |
| 4,773,348 A | 9/1988 | Rowley |
| 4,783,303 A | 11/1988 | Imgram |
| 4,803,033 A | 2/1989 | Rowley |
| 4,838,304 A | 6/1989 | Knapp |
| 4,853,164 A | 8/1989 | Kiang et al. |
| 4,877,660 A | 10/1989 | Overbergh et al. |
| 4,887,642 A | 12/1989 | Bernat |
| 4,942,644 A | 7/1990 | Rowley |
| 4,957,135 A | 9/1990 | Knapp |
| 4,971,112 A | 11/1990 | Knapp |
| 4,979,530 A | 12/1990 | Breda |
| 5,001,008 A | 3/1991 | Tokita et al. |
| 5,006,207 A | 4/1991 | Peterman et al. |
| 5,027,851 A | 7/1991 | Drees et al. |
| 5,053,097 A | 10/1991 | Johansson et al. |
| 5,090,062 A | 2/1992 | Hochstrasser |
| 5,095,554 A | 3/1992 | Gloor |
| 5,100,565 A | 3/1992 | Fujiwara et al. |
| 5,110,044 A | 5/1992 | Bergmann |
| 5,127,814 A | 7/1992 | Johnson et al. |
| 5,131,428 A | 7/1992 | Bory |
| 5,148,837 A | 9/1992 | Ångren et al. |
| 5,150,922 A | 9/1992 | Nakashiba et al. |
| 5,219,185 A | 6/1993 | Oddenino |
| 5,279,333 A | 1/1994 | Lawrence |
| 5,366,253 A | 11/1994 | Nakashiba et al. |
| 5,375,889 A | 12/1994 | Nakashiba et al. |
| 5,397,102 A | 3/1995 | Kingman |
| 5,417,242 A | 5/1995 | Goncze |
| 5,493,873 A | 2/1996 | Donselman et al. |
| 5,494,259 A | 2/1996 | Peterson |
| 5,518,027 A | 5/1996 | Saiki et al. |
| 5,527,503 A | 6/1996 | Rowley |
| 5,553,935 A | 9/1996 | Burnham et al. |
| 5,555,912 A | 9/1996 | Saadi et al. |
| 5,558,128 A | 9/1996 | Pawelzik et al. |
| 5,566,707 A | 10/1996 | Ching et al. |
| 5,573,037 A | 11/1996 | Cole et al. |
| 5,577,393 A | 11/1996 | Donselman et al. |
| 5,579,808 A | 12/1996 | Mikol et al. |
| 5,611,093 A | 3/1997 | Barnum et al. |
| 5,615,709 A | 4/1997 | Knapp |
| 5,622,210 A | 4/1997 | Crisman et al. |
| 5,622,670 A | 4/1997 | Rowley |
| 5,642,755 A | 7/1997 | Mark et al. |
| 5,660,692 A | 8/1997 | Nesburn et al. |
| 5,669,407 A | 9/1997 | Bailey |
| 5,669,417 A | 9/1997 | Lian-Jie |
| 5,669,595 A | 9/1997 | Bytheway |
| 5,685,341 A | 11/1997 | Chrysler et al. |
| 5,687,952 A | 11/1997 | Arnold et al. |
| 5,695,094 A | 12/1997 | Burnham et al. |
| 5,725,008 A | 3/1998 | Johnson |
| 5,730,173 A | 3/1998 | Sponheimer |
| 5,741,458 A | 4/1998 | Rowley |
| 5,746,244 A | 5/1998 | Woolley, Sr. et al. |
| 5,756,023 A | 5/1998 | Stachowiak |
| 5,758,690 A | 6/1998 | Humpert et al. |
| 5,775,587 A | 7/1998 | Davis |
| 5,803,120 A | 9/1998 | Bertoli |
| 5,813,435 A | 9/1998 | Knapp |
| 5,833,279 A | 11/1998 | Rowley |
| 5,850,855 A | 12/1998 | Kerschbaumer et al. |
| 5,857,489 A | 1/1999 | Chang |
| 5,861,200 A | 1/1999 | Rowley |
| 5,865,473 A | 2/1999 | Semchuck et al. |
| 5,875,809 A | 3/1999 | Barrom |
| 5,893,387 A | 4/1999 | Paterson et al. |
| 5,895,695 A | 4/1999 | Rowley |
| 5,916,647 A | 6/1999 | Weinstein |
| 5,924,451 A | 7/1999 | Kuo |
| 5,927,333 A | 7/1999 | Grassberger |
| 5,934,325 A | 8/1999 | Brattoli et al. |
| 5,937,892 A | 8/1999 | Meisner et al. |
| 5,944,225 A | 8/1999 | Kawolics |
| 5,950,663 A | 9/1999 | Bloomfield |
| 5,960,490 A | 10/1999 | Pitch |
| 5,965,077 A | 10/1999 | Rowley et al. |
| 5,975,143 A | 11/1999 | Järvenkylä et al. |
| 5,979,489 A | 11/1999 | Pitch |
| 6,013,382 A | 1/2000 | Coltrinari et al. |
| 6,023,796 A | 2/2000 | Pitch |
| 6,029,860 A | 2/2000 | Donselman et al. |
| 6,029,948 A | 2/2000 | Shafer |
| 6,053,214 A | 4/2000 | Sjoberg et al. |
| 6,062,251 A | 5/2000 | Pitch |
| 6,070,614 A | 6/2000 | Holzheimer et al. |
| 6,070,916 A | 6/2000 | Rowley |
| 6,073,972 A | 6/2000 | Rivera |
| 6,079,447 A | 6/2000 | Holzheimer et al. |
| 6,082,407 A | 7/2000 | Paterson et al. |
| 6,082,780 A | 7/2000 | Rowley et al. |
| 6,085,784 A | 7/2000 | Bloom et al. |
| 6,116,884 A | 9/2000 | Rowley et al. |
| 6,123,232 A | 9/2000 | Donselman et al. |
| 6,131,600 A | 10/2000 | Chang |
| 6,138,296 A | 10/2000 | Baker |
| 6,155,297 A | 12/2000 | MacAusland et al. |
| 6,161,230 A | 12/2000 | Pitsch |
| 6,170,098 B1 | 1/2001 | Pitsch |
| 6,177,516 B1 | 1/2001 | Hudak |
| 6,202,686 B1 | 3/2001 | Pitsch et al. |
| 6,202,980 B1 | 3/2001 | Vincent et al. |
| 6,227,464 B1 | 5/2001 | Allmendinger et al. |
| 6,238,575 B1 | 5/2001 | Patil |
| 6,256,810 B1 | 7/2001 | Baker |
| 6,270,125 B1 | 8/2001 | Rowley et al. |
| 6,287,501 B1 | 9/2001 | Rowley |
| 6,293,336 B1 | 9/2001 | Emerick, Sr. et al. |
| 6,296,017 B2 | 10/2001 | Kimizuka |
| 6,305,407 B1 | 10/2001 | Selby |
| 6,315,715 B1 | 11/2001 | Taylor et al. |

| Patent | Date | Inventor |
|---|---|---|
| 6,328,059 B1 | 12/2001 | Testori et al. |
| 6,334,466 B1 | 1/2002 | Jani et al. |
| 6,341,617 B1 | 1/2002 | Wilson |
| 6,349,733 B1 | 2/2002 | Smith |
| 6,378,790 B1 | 4/2002 | Paterson et al. |
| 6,378,912 B1 * | 4/2002 | Condon et al. .............. 285/220 |
| 6,385,794 B1 | 5/2002 | Miedzius et al. |
| 6,464,266 B1 | 10/2002 | O'Neill et al. |
| 6,485,666 B1 | 11/2002 | Rowley |
| 6,557,907 B2 | 5/2003 | Rowley |
| 6,609,732 B1 | 8/2003 | Souvatzidis et al. |
| 6,635,334 B1 | 10/2003 | Jackson et al. |
| 6,732,543 B2 | 5/2004 | Jenkins, Jr. et al. |
| 6,770,376 B2 | 8/2004 | Chen |
| 6,770,384 B2 | 8/2004 | Chen |
| 6,783,160 B2 | 8/2004 | Rowley |
| 6,803,133 B2 | 10/2004 | Chen |
| 6,817,379 B2 | 11/2004 | Perla |
| 6,835,777 B2 | 12/2004 | Botros |
| 6,838,041 B2 | 1/2005 | Rowley |
| 6,848,719 B2 | 2/2005 | Rowley |
| 6,860,523 B2 | 3/2005 | O'Neill et al. |
| 6,860,524 B1 | 3/2005 | Rowley |
| 6,877,172 B2 | 4/2005 | Malek et al. |
| 6,894,115 B2 | 5/2005 | Botros |
| 6,902,210 B1 | 6/2005 | Rowley |
| 6,920,899 B2 | 7/2005 | Haenlein et al. |
| 6,959,736 B2 | 11/2005 | Järvenkylä |
| 6,962,168 B2 | 11/2005 | McDaniel et al. |
| 6,978,795 B2 | 12/2005 | Perrin |
| 7,118,138 B1 | 10/2006 | Rowley et al. |
| 7,225,828 B2 | 6/2007 | Giagni et al. |
| 7,415,991 B2 * | 8/2008 | Meehan et al. .............. 137/801 |
| 2002/0100139 A1 | 8/2002 | Rowley |
| 2002/0167171 A1 | 11/2002 | Becker et al. |
| 2004/0007278 A1 | 1/2004 | Williams |
| 2004/0021120 A1 | 2/2004 | Turnau, III et al. |
| 2004/0060608 A1 | 4/2004 | Angus |
| 2004/0117906 A1 | 6/2004 | Baker et al. |
| 2004/0150132 A1 | 8/2004 | Rowley |
| 2004/0176503 A1 | 9/2004 | Czayka et al. |
| 2005/0005989 A1 | 1/2005 | Roloff |
| 2005/0194051 A1 | 9/2005 | Pinette |
| 2006/0108705 A1 | 5/2006 | Rowley |
| 2006/0118185 A1 | 6/2006 | Nobili |
| 2006/0124183 A1 | 6/2006 | Kuo |
| 2006/0130908 A1 | 6/2006 | Marty et al. |
| 2006/0170134 A1 | 8/2006 | Rowley et al. |
| 2006/0202142 A1 | 9/2006 | Marty et al. |
| 2007/0044852 A1 | 3/2007 | Pinette |
| 2007/0137714 A1 | 6/2007 | Meehan et al. |
| 2007/0137718 A1 | 6/2007 | Rushlander et al. |

FOREIGN PATENT DOCUMENTS

| | | |
|---|---|---|
| DE | 10133041 | 1/2003 |
| EP | 0 632 220 | 1/1995 |
| EP | 0 808 952 | 11/1997 |
| EP | 1 392 935 B1 | 10/2005 |
| JP | 3094877 | 4/1991 |
| JP | 06-010382 | 1/1994 |
| JP | U6-56180 | 8/1994 |
| JP | 07-40044 | 2/1995 |
| JP | 200132343 | 2/2001 |
| KR | 20-0318953 | 6/2003 |
| KR | 2006-0122777 | 11/2006 |
| WO | WO 91/05191 | 4/1991 |
| WO | WO 00/61831 | 10/2000 |
| WO | WO 02/25022 | 3/2002 |
| WO | WO 2005/108829 | 11/2005 |

OTHER PUBLICATIONS

SpecialChem S.A., Silane Crosslinking Agents Center, Crosslinking Mechanism, www.specialchem4polymers.com/tc/silane-crosslinking-agents/index.aspx?id=mechanism, at least as early as Jun. 7, 2005, 2 pgs.

PPI Plastics Pipe Institute, Crosslinked Polyethylene (PEX) Tubing, TN-17/2001, www.plasticpipe.org/pdf/pubs/notes/tn17-01.pdf, Jun. 2001, 7 pgs.

Dadex Polydex, 2005, 1 pg.

Dadex Polydex—PPR Pipe System for Hot and Cold Water Supply and Distribution, 2005, 2 pgs.

Dow, Plastic Pipes Europe, Middle East & Africa, Hot and Cold Water Pipes, 2007, 1 pg.

Dow, Plastic Pipes Europe, Middle East, & Africa, Dowlex PE-RT, 2007, 2 pgs.

Kerox, Standard Cartridges, 2005, 3 pgs.

Ticona Engineering Polymers, Engineering Polymers for Innovative Applications catalog, Mar. 2006, 16 pgs.

* cited by examiner

OVERMOLD INTERFACE FOR FLUID CARRYING SYSTEM

RELATED APPLICATIONS

This application relates to co-pending U.S. patent application Ser. No. 11/700,586, filed Jan. 31, 2007, titled "SPOUT TIP ATTACHMENT", the disclosure of which is expressly incorporated by reference herein.

BACKGROUND AND SUMMARY OF THE INVENTION

The present invention relates interfaces of fluid carrying systems and in particular to interfaces provided as apart of an overmold of a portion of a fluid carrying system.

It is known to overmold various portions of fluid carrying systems. Exemplary overmolds are presented in U.S. Pat. Nos. 5,895,695, 6,082,780, 6,287,501, and 6,902,210 each listing William W. Rowley as an inventor, the disclosures of which are expressly incorporated by reference herein.

In an exemplary embodiment of the present disclosure, a fluid carrying system is provided. The fluid carrying system comprising a fluid transport component and an overmold component. The fluid transport component includes a body portion with a fluid conduit therein. The body portion includes an end portion having a longitudinal axis. The overmold component includes a body and a fluid conduit. The body includes a first portion overlapping a portion of an exterior of the body portion of the fluid transport component and a second portion extending beyond the end portion of the body portion of the fluid transport component. The fluid conduit is located in the body of the overmold component and having a longitudinal axis. The fluid conduit of the overmold component is in fluid communication with an exterior of the body of the overmold component and with the fluid conduit of the fluid transport component. The body of the overmold component is asymmetrical about a first plane passing through the longitudinal axis of the fluid conduit of the overmold component.

In another exemplary embodiment of the present disclosure, a method of making a fluid carrying system is provided. The method includes the steps of providing a non-metallic fluid transport component including a body portion with a fluid conduit therein; positioning at least a portion of the fluid transport component in a mold; and overmolding an overmold component on an end portion of the fluid transport component. The overmold component includes a first end having an interface, and a fluid conduit formed in the overmold component. The fluid conduit of the overmold component includes a longitudinal axis angled relative to the interface.

In a further exemplary embodiment of the present disclosure, a fluid carrying system is provided. The fluid carrying system includes a fluid transport component and an overmold component. The fluid transport component includes a body portion with a fluid conduit therein. The body portion includes an end portion including a longitudinal axis. The overmold component includes a body and a fluid conduit. The body including a first portion overlapping a portion of an exterior of the body portion of the fluid transport component and a second portion extending beyond the end portion of the body portion of the fluid transport component. The fluid conduit is formed in the body of the overmold component. The fluid conduit of the overmold component includes a longitudinal axis and being in fluid communication with an exterior of the body of the overmold component and with the fluid conduit of the fluid transport component. The body of the overmold component includes a first end including a sealing surface and a terminal end of the fluid conduit of the overmold component.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to the precise forms disclosed. Rather, the embodiments selected for description have been chosen to enable one skilled in the art to practice the invention. Although the disclosure is described in connection with water, it should be understood that additional types of fluids may be used.

Figure 1:
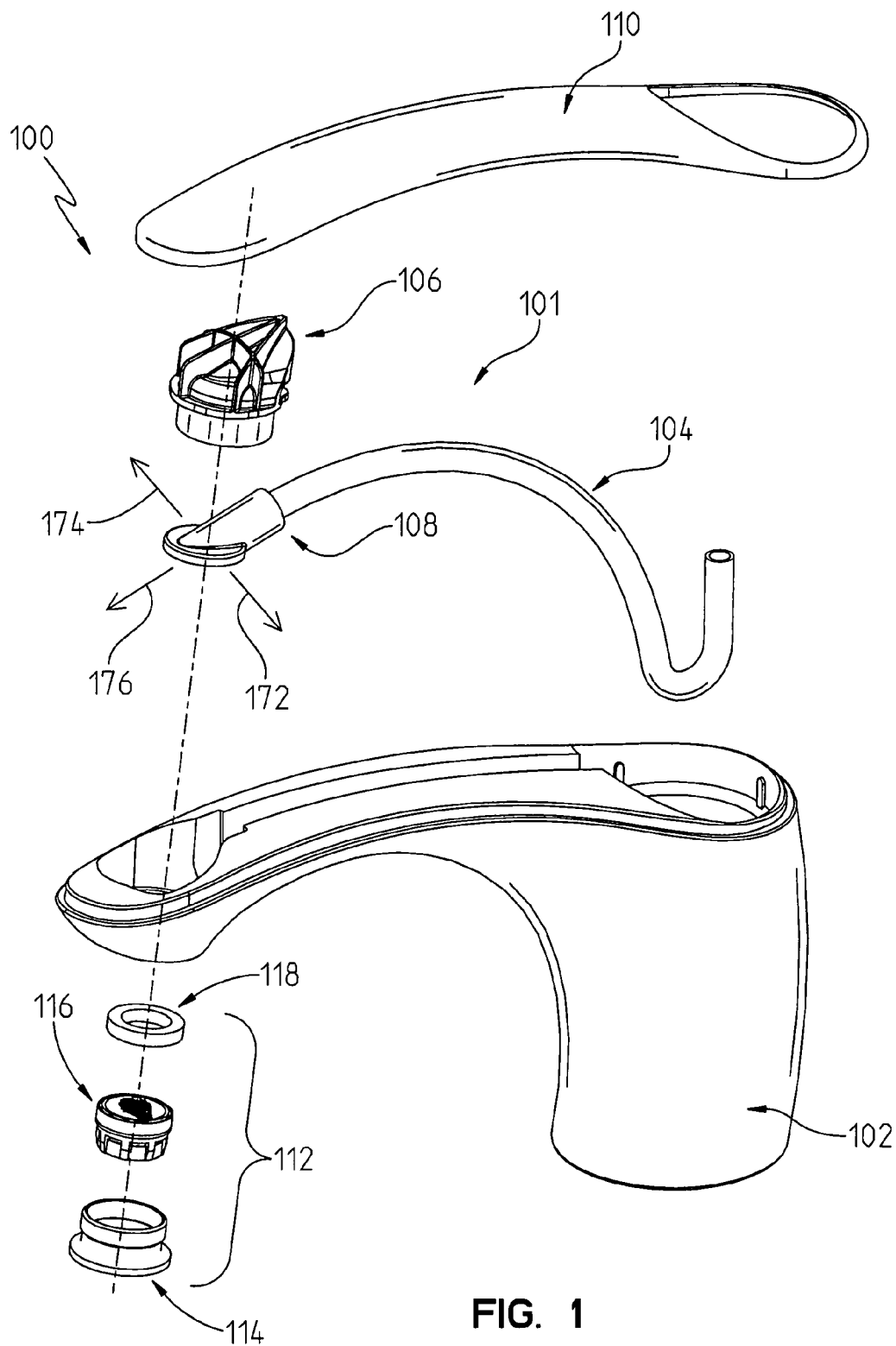
FIG. 1 is an exploded, perspective view of a spout assembly including a fluid carrying system.

Referring to FIG. 1, an illustrative embodiment of a spout assembly 100 is shown. Spout assembly 100 may be used with a faucet assembly having a faucet valve, such as the faucet assembly shown in U.S. patent application Ser. No. 11/700,634, filed Jan. 31, 2007, titled "FAUCET INCLUDING A MOLDED WATERWAY ASSEMBLY", the disclosure of which is expressly incorporated by reference herein. Spout assembly 100 includes a spout body 102 having a recess, a fluid carrying system 101, a holder 106 for holding an end of fluid carrying system 101, a cover 110, and an aerator assembly 112. Aerator assembly 112 includes an aerator body 114 which is coupled to spout body 102, an aerator 116, and a seal 118. Seal 118 creates a fluid tight connection between end portion 108 of fluid carrying system 101 and aerator 116.

In one embodiment, spout body 102 is made from a non-metallic material. Exemplary non-metallic materials include thermoplastic and thermoset materials. Exemplary thermoset materials include polyesters, melamine, melamine urea, melamine phenolic, and phenolic. Additional details regarding spout assembly 100 are provided in co-pending U.S. patent application Ser. No. 11/700,586, filed Jan. 31, 2007, titled "SPOUT TIP ATTACHMENT", the disclosure of which is expressly incorporated by reference herein. In one embodiment, the spout body 102 is made from a metallic material.

Figure 2A:
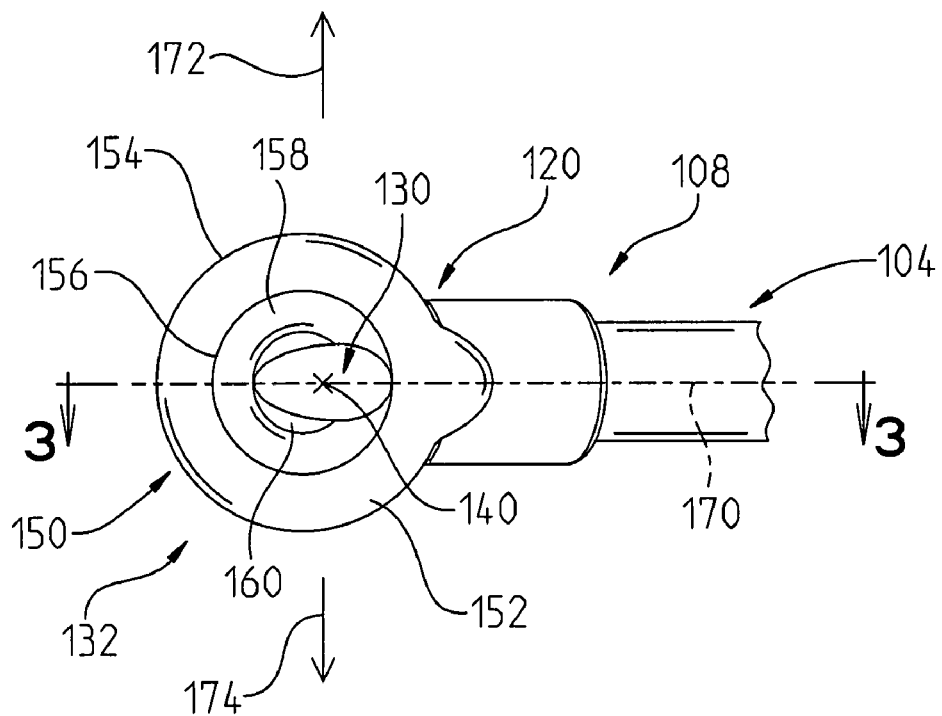
FIG. 2A is a bottom view of a fluid carrying system including a fluid conduit and an associated overmold component including an interface.
Figure 2B:
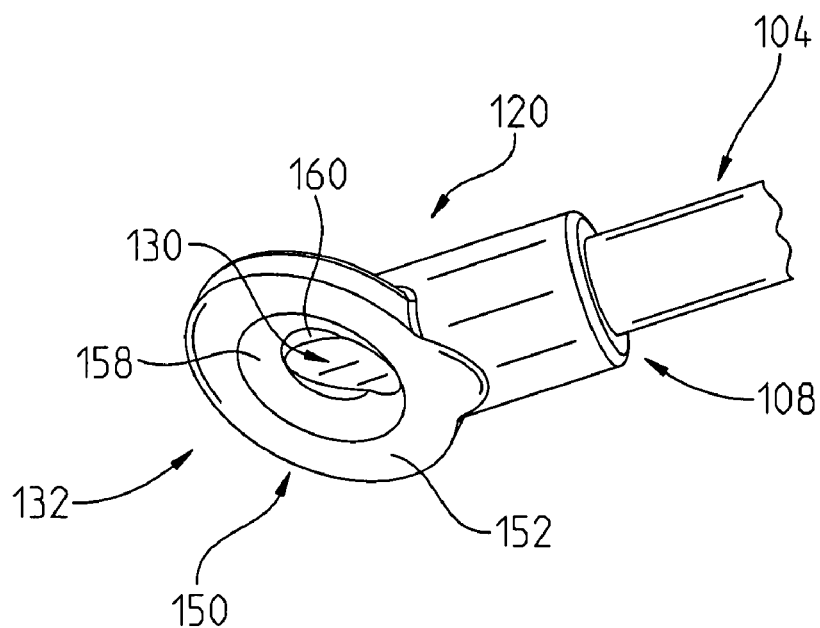
FIG. 2B is a perspective view the fluid conduit and the associated overmold component of FIG. 3A.
Figure 3:
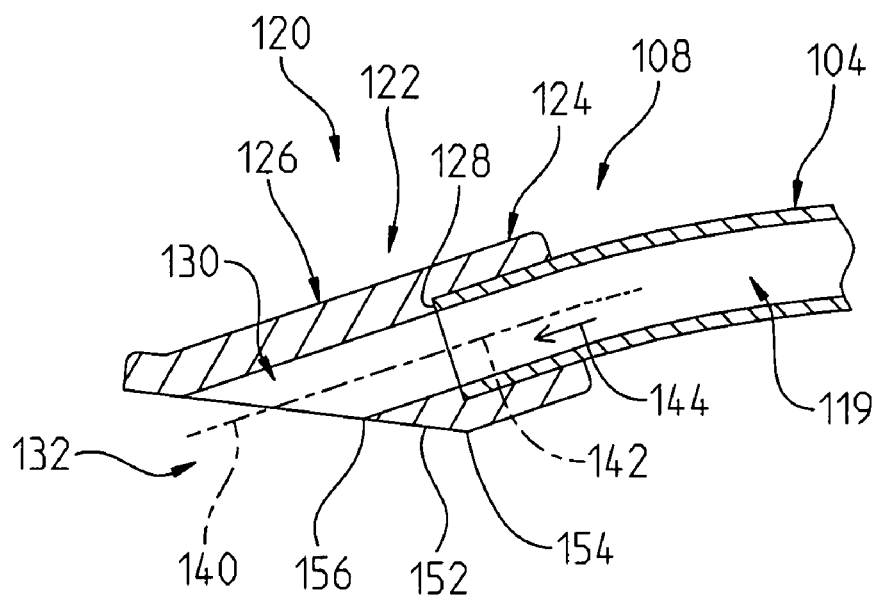
FIG. 3 is a sectional view along lines 4-4 in FIG. 2A.

Referring to FIGS. 2A-3, fluid transport component 104 includes a fluid conduit 119 through which fluid may flow. An exemplary fluid is water as supplied by a passageway or a faucet valve. Further, an end portion 108 of fluid transport component 104 is coupled to an overmold component 120.

Overmold component 120 includes a body 122 having a first portion 124 overlapping end portion 108 of fluid transport component 104 and a second portion 126 extending beyond an end face 128 of fluid transport component 104. Overmold component 120 further includes a fluid passageway or conduit 130.

Fluid conduit 130 of overmold component 120 is in fluid communication with fluid conduit 119 of fluid transport component 104 and terminates at a first end 132 of overmold component 120. In one embodiment, fluid conduit 130 and fluid conduit 119 have a circular cross-section and have generally equal diameters. In one embodiment, fluid conduit 130 is generally cylindrical. In one embodiment, one or both of fluid conduit 130 and fluid conduit 119 have different shape cross-sections and may have differing extents, such as diameters in the case of circular cross-sections. In the case of elliptical cross-sections, a minimum extent would be the minor axis while a maximum extent would be the major axis. In one embodiment, a longitudinal axis 140 of fluid conduit 130 is generally coaxial with a longitudinal axis 142 of end portion 108. Longitudinal axis 142, in the illustrated embodiment, passing through a center point of fluid conduit 119 generally parallel to a direction of flow 144 of fluid in fluid conduit 119 proximate end 128.

Fluid transport component 104 may be made of a flexible material or a non-flexible material. Further, fluid transport component 104 may include a metallic material or a non-metallic material. In one embodiment, fluid transport component 104 is made from a polymeric material. In one embodiment, fluid transport component 104 is made from a cross-linked polyethylene (PEX) material. In one embodiment, fluid transport component 104 is made from a pre-formed PEX tubing. In one embodiment, fluid transport component 104 is made from a corrugated PEX tubing to increase flexibility. Additional details about PEX materials and methods for creating a fluid transport component 104 therefrom are found in one or more of U.S. Pat. Nos. 5,895,695, 6,082,780, 6,287,501, and 6,902,210, the disclosures of which are expressly incorporated by reference herein. The fluid carrying system 101 described herein may be used with the components disclosed in U.S. patent application Ser. No. 11/700,634, filed Jan. 31, 2007, titled "FAUCET INCLUDING A MOLDED WATERWAY ASSEMBLY," the disclosure of which is expressly incorporated by reference herein.

While in one illustrative embodiment, fluid transport component 104 is made of a cross-linked polyethylene (PEX), it should be appreciated that other polymers may be substituted therefor. For example, fluid transport component 104 may be formed of any polyethylene (PE) (such as raised temperature resistant polyethylene (PE-RT)), polypropylene (PP) (such as polypropylene random (PPR)), or polybutylene (PB). It is further envisioned that fluid transport component 104 could be formed of cross-linked polyvinyl chloride (PVCX) using silane free radical initiators, from cross-linked polyurethane, or cross-linked propylene (XLPP) using peroxide or silane free radical initiators.

Figure 4:
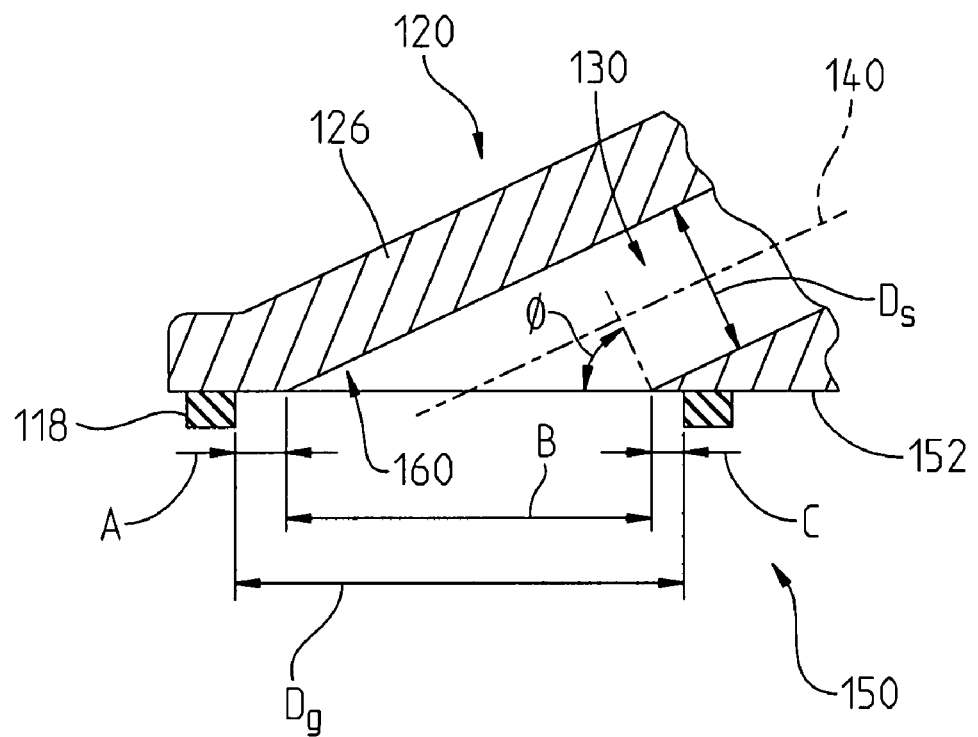
FIG. 4 is a diagrammatic view of the relationship between a diameter of the fluid conduit of FIG. 3, a diameter of a sealing region of the interface of the overmold component, and an angle between a flat sealing surface of the interface of the overmold component and an axis of the fluid conduit.

Referring to FIGS. 2A and 2B, first end 132 of overmold component 120 includes an interface 150. Interface 150 in the illustrated embodiment includes a sealing surface 152. In the illustrated embodiment, sealing surface 152 is generally flat. Interface 150 operates to seal against another component to restrict the flow of fluid. In the illustrated embodiment, interface 150 seals against seal 118 of aerator assembly 112, as shown in FIG. 4. In one embodiment, interface 150 may have other shapes to facilitate coupling with a seal, such as a channel. Further, sealing surface 152 may be concave or convex as opposed to flat. In one embodiment, seal 118 is an o-ring which is positioned proximate an outer periphery edge of aerator 116 and interface 150 includes a downwardly extending wall. The o-ring is positioned between aerator 116 and the downwardly extending wall of interface 150 when assembled.

In the illustrated embodiment, sealing surface 152 is bounded by an outer perimeter 154 and an inner perimeter 156. A second surface 158 connects to sealing surface 152 along inner perimeter 156. Second surface 158 is angled relative to sealing surface 152. A third surface 160 is connected to second surface 158 opposite of sealing surface 152. Third surface 160 is generally parallel with sealing surface 152. In FIG. 3, the second surface 158 is angled at an angle equal to the angle of fluid conduit 130 such that second surface 158 in FIG. 3 appears to be an extension of fluid conduit 130.

Sealing surface 152 may also cover the entire bottom of first end 132 replacing second surface 158 and third surface 160. The diagrammatic representation in FIG. 4, illustrates this embodiment.

In one embodiment, fluid conduit 130 intersects the exterior of body 122 at a location within outer perimeter 154 of sealing surface 152. In one embodiment, as illustrated in FIG. 2A, fluid conduit 130 intersects the exterior of body 122 at a location within outer perimeter 154 of sealing surface 152 and inner perimeter 156 of sealing surface 152. In both cases, sealing surface 152 surrounds a terminal end 160 of fluid conduit 130.

Referring to FIG. 4, the relationship between the angle (φ) made by longitudinal axis 140 of the fluid conduit 130 of overmold component 120 and the sealing surface 152 of interface 150 is shown. As shown in FIG. 4, the diameter of the seal 118 which sealing surface 152 interacts with is $D_g$. Further, the inside diameter of the fluid conduit 130 is identified as $D_s$. The footprint of the projection of the internal diameter $D_s$ onto sealing surface 152 (also known as the terminal end 160 of fluid conduit 130), identified as distance B, is governed by the value of angle φ as shown in equation 1.

$$B = \frac{D_s}{\cos(\phi)} \tag{1}$$

Further, the diameter of the gasket 118 ($D_g$) is related to distance B as shown in equation 2

$$D_g = A + B + C \tag{2}$$

wherein A and C correspond to offset distances the projection of fluid conduit 130 should maintain from seal 118. Dg is also referred to as the limiting extent of a sealing region of interface 150. The sealing region is circular in the illustrated embodiment, but may be any shape.

Substituting equation 1 into equation 2 results in equation 3.

$$D_g = A + \frac{D_s}{\cos(\phi)} + C \tag{3}$$

Assuming that no offset is desired then A and C are set equal to zero and equation 3 becomes equation 4.

$$D_g = \frac{D_s}{\cos(\phi)} \quad (4)$$

The angle that the longitudinal axis 140 makes with the sealing surface 150 is given in equation 5 as the inverse cosine of the limiting extent of fluid conduit 130 (a diameter in the case of a circular cross-section) divided by a limiting extent of a sealing region of sealing surface 152 (a diameter of the terminal end 160 of fluid conduit 130 which is equal to a diameter of seal 118 if no offset is desired).

$$\phi = \cos^{-1}\left(\frac{D_s}{D_g}\right) \quad (5)$$

In one embodiment, the angle that the longitudinal axis 140 makes with the sealing surface 152 is at least equal to the value given in equation 5 and less than ninety degrees. In one embodiment, the angle ($\phi$) that the longitudinal axis 140 makes with the sealing surface 152 is at least equal to the value given in equation 5 and up to and including ninety degrees.

Referring to FIG. 2A, in the illustrated embodiment, overmold component 120 is symmetrical about a plane 170 which pass through axis 140 and is normal to sealing surface 152. However, overmold component 120 is not symmetrical about a second plane (not shown) which passes through axis 140 and is angled relative to first plane 170. As such, in one embodiment overmold component 120 may not be characterized as being a revolved solid.

In one embodiment, overmold component 120 is made in the following manner. In general, at least an end portion 108 of a fluid transport component 104 is provided and a portion thereof is placed in a mold. In one embodiment, the fluid transport component 104 is placed on a fixture, such as a mandrel which receives fluid conduit 119, whose shape defines at least the fluid conduit 130 of overmold component. In one embodiment, fluid transport component 104 is made from a non-metallic material, such as PEX. Material is introduced into the mold to form overmold component 120. The material is positioned against an exterior of fluid transport component 104 and couples to fluid transport component 104. In one embodiment the material that overmold component 120 is formed of is a glass filled polyethylene. In one embodiment, fluid transport 104 is made of a polyethylene. The glass-filled polyethylene of overmold component 120 is then cross-linked with the polyethylene of fluid transport 104.

In one embodiment, the step of overmolding the overmold component 120 on the end portion 108 of the fluid transport component 104 includes the steps of providing a first mold component and a second mold component, the first mold component and the second mold component cooperating to define a partial shape of the overmold component. In the illustrated embodiment, the first mold component and the second mold component are configured to define of shape of the entire overmold component 120, except for sealing surface 152, fluid conduit 130, and any geometry there between, such as second surface 158 and third surface 160. Referring to FIGS. 1 and 2A, the first mold component and the second mold component would be moveable in directions 172 and 174, respectively, to open and release fluid carrying system 101. Alternatively, one of first mold component and second mold component remains stationary. The first mold component and the second mold component split generally along plane 170 (FIG. 2A).

In addition, a third mold component is provided which defines a shape of the interface 150 and the fluid conduit 130 of the overmold component 120. The a portion third mold component is received in fluid conduit 119 by placing end portion 108 of fluid transport component over the portion of the third mold component. The third mold component is moveable in direction 176 to open and release fluid carrying system 101. Alternatively, the third mold component remains stationary.

A closed mold is formed by bringing the first mold component, the second mold component, and the third mold component together such that a cavity is defined that corresponds to the shape of overmold component 120. Material is then introduced into the mold to fill the cavity and form overmold component 120. Finally, the first mold component, the second mold component, and the third mold component are positioned in a spaced apart arrangement to form an open mold and to permit the removal of fluid carrying system 101.

Although the invention has been described in detail with reference to certain preferred embodiments, variations and modifications exist within the spirit and scope of the invention as described and defined in the following claims.

The invention claimed is:

1. A fluid carrying system, comprising:
a fluid transport component including a body portion with a fluid conduit therein, the body portion having an end portion including a longitudinal axis; and
an overmold component including:
a body including a first portion overlapping a portion of an exterior of the body portion of the fluid transport component and a second portion extending beyond the end portion of the body portion of the fluid transport component, and
a fluid conduit formed in the body of the overmold component, the fluid conduit of the overmold component having a longitudinal axis, the fluid conduit of the overmold component being in fluid communication with an exterior of the body of the overmold component and with the fluid conduit of the fluid transport component, wherein the body of the overmold component includes a first end including a sealing surface and a terminal end of the fluid conduit of the overmold component, wherein the sealing surface is bounded by an inner perimeter, at least a portion of the terminal end of the fluid conduit of the overmold component is spaced apart from the inner perimeter of the sealing surface in the direction of the longitudinal axis.

2. The fluid carrying system of claim 1, wherein the sealing surface is a flat sealing surface.

3. The fluid carrying system of claim 2, wherein the flat sealing surface surrounds the terminal end of the fluid conduit of the overmold component.

4. The fluid carrying system of claim 2, wherein the overmold component is asymmetrical about a first plane passing through the longitudinal axis of the fluid conduit of the overmold component and including the longitudinal axis of the fluid conduit of the overmold component.

5. The fluid carrying system of claim 4, wherein the overmold component is symmetrical about a second plane passing through the longitudinal axis of the fluid conduit of the overmold component and normal to the flat sealing surface.

6. The fluid carrying system of claim 2, wherein an angle between the longitudinal axis of the fluid conduit of the overmold component and the flat sealing surface of the overmold component is less than ninety degrees.

7. The fluid carrying system of claim 6, wherein the angle is at least equal to an inverse cosine of a limiting extent of the fluid conduit of the overmold component divided by a limiting extent of a sealing region of the flat sealing surface.

8. The fluid carrying system of claim 1, wherein the longitudinal axis of the fluid conduit of the overmold component is generally coaxial with the longitudinal axis of the fluid transport component.

9. The fluid carrying system of claim 8, wherein a diameter of the fluid conduit of the overmold component is generally equal to a diameter of the fluid conduit of the fluid transport component.

10. The fluid carrying system of claim 1, wherein the fluid transport component is made of a non-metallic material.

11. The fluid carrying system of claim 10, wherein the fluid transport component is made of a polymeric material.

12. The fluid carrying system of claim 10, wherein the fluid transport component is made of a PEX material.

13. A fluid carrying system, comprising:
a fluid transport component including a body portion with a fluid conduit therein, the body portion having an end portion including a longitudinal axis; and
an overmold component including:
a body including a first portion overlapping a portion of an exterior of the body portion of the fluid transport component and a second portion extending beyond the end portion of the body portion of the fluid transport component, the second portion including an end surface; and
a fluid conduit located in the body of the overmold component, the fluid conduit of the overmold component having a longitudinal axis, the fluid conduit of the overmold component being in fluid communication with an exterior of the body of the overmold component and with the fluid conduit of the fluid transport component, wherein the end surface of the body of the overmold component is asymmetrical about a first plane passing through the longitudinal axis of the fluid conduit of the overmold component and including the longitudinal axis of the fluid conduit of the overmold component and the end surface of the body of the overmold component is symmetrical about a second plane including the longitudinal axis of the fluid conduit of the overmold component, the second plane being angled relative to the first plane, wherein the longitudinal axis of the fluid conduit of the overmold component is generally coaxial with the longitudinal axis of the end portion of the fluid transport component.

14. The fluid carrying system of claim 13, wherein the fluid transport component is made of a flexible material.

15. The fluid carrying system of claim 14, wherein the fluid transport component is made of a polymeric material.

16. The fluid carrying system of claim 13, wherein the fluid transport component is made of a PEX material.

17. The fluid carrying system of claim 16, wherein the fluid transport component has a circular cross-section.

18. The fluid carrying system of claim 13, further comprising a spout body having a recess, wherein the fluid transport component and the overmold component are received in the recess of the spout body.

19. The fluid carrying system of claim 18, wherein a diameter of the fluid conduit of the overmold component is generally equal to a diameter of the fluid conduit of the fluid transport component.

20. The fluid carrying system of claim 13, wherein the body of the overmold component includes a flat sealing surface being bounded by an outer perimeter, the fluid conduit of the overmold component being in fluid communication with the exterior of the body of the overmold component at a location within the outer perimeter of the flat sealing surface.

21. The fluid carrying system of claim 20, wherein the flat sealing surface is further bounded by an inner perimeter, the location wherein the fluid conduit of the overmold component is in fluid communication with the exterior of the body of the overmold component is spaced apart from the flat sealing surface.

22. The fluid carrying system of claim 20, wherein the second plane is normal to the flat sealing surface of the overmold component.

23. The fluid carrying system of claim 20, wherein an angle between the longitudinal axis of the fluid conduit of the overmold component and the flat sealing surface of the overmold component is less than ninety degrees.

24. The fluid carrying system of claim 23, wherein the angle is at least equal to an inverse cosine of a limiting extent of the fluid conduit of the overmold component divided by a limiting extent of a sealing region of the flat sealing surface.

25. The fluid carrying system of claim 24, wherein the limiting extent of the sealing region corresponds to an inner perimeter of the flat sealing surface, the inner perimeter being circular and wherein the fluid conduit of the overmold component is cylindrical and the limiting extent of the fluid conduit of the overmold component is a diameter of the fluid conduit of the overmold component.

* * * * *